US012619095B2

(12) United States Patent
Dorfmueller

(10) Patent No.: US 12,619,095 B2
(45) Date of Patent: May 5, 2026

(54) PRODUCTION OF CAMERAS WITH REDUCED REJECTION RATE

(71) Applicant: Robert Bosch GmbH, Stuttgart (DE)

(72) Inventor: Jens Dorfmueller, Magstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 177 days.

(21) Appl. No.: 18/260,892

(22) PCT Filed: Jan. 19, 2022

(86) PCT No.: PCT/EP2022/051079
§ 371 (c)(1),
(2) Date: Jul. 10, 2023

(87) PCT Pub. No.: WO2022/189050
PCT Pub. Date: Sep. 15, 2022

(65) Prior Publication Data
US 2024/0053620 A1 Feb. 15, 2024

(30) Foreign Application Priority Data

Mar. 10, 2021 (DE) ..................... 10 2021 202 312.6

(51) Int. Cl.
*B32B 41/00* (2006.01)
*G02B 27/62* (2006.01)
*H04N 17/00* (2006.01)
(52) U.S. Cl.
CPC ........... *G02B 27/62* (2013.01); *H04N 17/002* (2013.01)
(58) Field of Classification Search
CPC ...... G02B 27/62; H04N 17/002; G06N 3/048; G03B 17/00; G03B 43/00; G06Q 10/06395; G06Q 50/04

USPC .................... 156/60, 64, 350, 351, 378, 379
See application file for complete search history.

(56) References Cited

FOREIGN PATENT DOCUMENTS

| | | |
|---|---|---|
| DE | 102014220519 A1 | 4/2016 |
| GB | 2572327 A | 10/2019 |
| JP | 2008170981 A | 7/2008 |
| JP | 2018151575 A | 9/2018 |

(Continued)

OTHER PUBLICATIONS

International Search Report for PCT/EP2022/051079, Issued May 9, 2022.

(Continued)

*Primary Examiner* — Michael N Orlando
*Assistant Examiner* — Joshel Rivera
(74) *Attorney, Agent, or Firm* — NORTON ROSE FULBRIGHT US LLP

(57) ABSTRACT

A method for producing a camera. The method includes: providing prefabricated components; adjusting at least two of these prefabricated components relative to one another in accordance with at least one specified optimality criterion; and adhesively bonding the components to one another in the adjusted state; wherein prior data characterizing a specific specimen of at least one of the prefabricated components, and/or measured data in respect of the optical performance of the combination of the components adjusted with respect to one another, are mapped by a trained machine learning model onto a prediction for the optical performance that the camera will deliver once it has run through at least one additional production step after the adhesive bonding; and this prediction is used as feedback for an influencing action on the production process.

11 Claims, 2 Drawing Sheets

(56) References Cited

FOREIGN PATENT DOCUMENTS

| | | | |
|---|---|---|---|
| WO | 2018204410 | A1 | 11/2018 |
| WO | 2020158325 | A1 | 8/2020 |

OTHER PUBLICATIONS

Bauer et al., "Automatic Estimation of Modulation Transfer Functions," 2018 IEEE International Conference on Computational Photography (ICCP), 2018, pp. 1-40. <https://arxiv.org/pdf/1805.01872.pdf> Downloaded Jul. 10, 2023.

PRODUCTION OF CAMERAS WITH REDUCED REJECTION RATE

FIELD

The present invention relates to the production of cameras made of prefabricated components.

BACKGROUND INFORMATION

The optical performance of a camera depends on whether the actual configuration of the beam path from the scenery being imaged to the sensor being used for image capture corresponds to the advance planning for this purpose. The optical components used, e.g., lenses and objectives, must therefore conform to their respective specifications and be mounted in the correct spatial arrangement relative to one another.

The optical performance of the camera ultimately produced results from an interaction between the precision of the optical components on the one hand and the precision of the spatial arrangement of these components on the other hand. When the optical components are produced with very tight tolerances, the accuracy of pick-and-place production techniques is sufficient for obtaining cameras with acceptable optical performance. If lower-cost optical components produced with wider tolerances are used, the resulting deviations of the beam path from the advance planning can be compensated for at least in part by adjusting the components during production. In this adjustment (also referred to as "active alignment"), components are moved relative to one another according to one or more degrees of freedom, and a configuration in which the optical performance is good is fixed by adhesive bonding of the components. German Patent Application No. DE 10 2014 220 519 A1 describes an exemplary method for such an adjustment.

SUMMARY

The present invention provides a method for producing a camera. For example, this camera can in particular be designed to monitor the environment of a vehicle, or at least a portion thereof. For example, such cameras can enable a driver of the vehicle to see into otherwise difficult-to-see areas of the vehicle environment, e.g., behind the vehicle or in a "blind spot" not visible via mirrors. However, driving assistance systems or systems for the at least partially automated driving of a vehicle can also utilize camera images from the vehicle environment.

According to an example embodiment of the present invention, the method begins with providing prefabricated components. For example, these components can in particular include optical components, e.g., lenses, objectives, and image sensors. However, the components can also include, e.g., electronic circuitry for a further evaluation and transmission of the images captured by the image sensor, as well as a housing.

At least two of the prefabricated components are adjusted relative to one another in accordance with at least one specified optimality criterion. In the adjusted state, i.e., when the specified optimality criterion is satisfied, then the components are adhesively bonded to one another. This adhesive bonding can be initiated, e.g., by activating a light curing adhesive using UV light.

The optimality criterion can, e.g., include that an optical performance of the combination of the components being adjusted relative to one another and measured in accordance with any desired metric lies above a specified threshold.

In addition, according to an example embodiment of the present invention, prior data that characterize a specific specimen of at least one of the prefabricated components, and/or measured data, are used with respect to the optical performance of the combination of the components adjusted relative to one another. It is thus possible to use only prior data, only measured data (e.g., from an "active alignment" machine), or any combination of prior data and measured data. These data are mapped by a trained machine learning model onto a prediction for the optical performance that the camera will deliver after it has run through at least one additional production step after the adhesive bonding. This prediction is used as feedback for an action of influencing the production process.

If measured data with respect to the optical performance are obtained during the adjustment of the prefabricated components, then this already delivers an indication of how good the ultimate optical performance of the camera will be. However, it has been found that the state achieved in the context of the adjustment can yet change by way of the at least one further processing step which the camera runs through after the adhesive bonding of the components. For example, if another electronic circuit board is installed in a housing in which the optical components are already located, the housing may be shaken and/or heated. Furthermore, the adhesive used is not yet fully cured immediately after the adhesive bonding of the components. The components are indeed already protected from the adjustment achieved then becoming completely lost due to shaking or other handling of the camera, but the adhesive can still shrink during the course of the final curing, which can take several more minutes. The spatial arrangement of the adhesively bonded components can thus be changed slightly.

Changes in the optical performance of the camera between the adhesive bonding process and final completion cannot be described by a closed formula. However, it has surprisingly been shown that correlations exist between prior data and measured data obtained during the adjustment on the one hand and the ultimate optical performance of the camera at the end of the production process on the other hand, which correlations are independent of the specific configuration of further production steps after the adhesive bonding. These correlations can be learned by a machine learning model.

For example, if a specific part, e.g. a lens, already strongly deviates from the standard and can be adjusted only with much difficulty in relation to an objective so that that the combination of this lens and this objective enables a sharp image, then the probability is increased that a slight adhesive shrinkage or other change of the camera after the adhesive bonding already pushes the lens and objective arrangement out of the very sharp optimum and the camera altogether is no longer usable. In contrast, if the lens and objective are in perfect accordance with the standard, the optimum of the adjustment is significantly wider, so that, e.g. an offset caused by adhesive shrinkage has a significantly lower effect on the ultimate optical performance of the camera.

For example, according to an example embodiment of the present invention, in order to train the machine learning model, the prior data and the measured data for a specific number of training cameras on the one hand, as well as the optical performance measured after completion of the camera on the other hand, can be used as training data. Parameters that characterize the behavior of the machine learning model can, e.g., then be optimized with the goal that the machine learning model for each of the training cameras accurately maps the respective prior data and measured data onto the respective optical performance upon completion. If the training cameras and associated prior data and measured data feature sufficient variability, it is to be expected on the basis of the great power of machine learning models for generalization that the optical performance of previously unseen cameras produced subsequently will also be accurately predicted.

The trained machine learning model can in particular include, e.g., a neural network, and/or it can be a neural network. In particular, when training a neural network, weights are optimized as parameters. With these weights, inputs that are fed to the neurons and/or other processing units are merged by forming a weighted sum to effect an activation of this neuron or this processing unit. Based on this activation, the output of the neuron or processing unit, is ascertained by applying a specified non-linearity, e.g., a ReLU function or sigmoid function.

The ultimate utility of the prediction is that a possibly expected poor optical performance of the camera can be detected as early in the production process as possible. An expected poor performance can then ideally be improved in a targeted manner by applying appropriate measures in the production process. If this is not possible, then a camera that can no longer be "rescued" can at least be discarded early on as a reject before any further refining processing steps are performed.

For example, if it is determined during the adjustment that the completed camera will not function properly, then it no longer makes sense to add an electronic circuit board and adhesively bond it to the optical components. From the moment at which the camera can no longer be "rescued", every additional amount of time invested in this camera is wasted. The electronic circuit board itself can then also be lost, because dislodging it by hand from the discarded camera in order to be installed in a new camera can cost more than the board itself, provided that doing so is even technically feasible.

The situation is basically similar to pursuing an academic degree. At the beginning of their studies, students are exposed to particularly high performance pressure in the basic subjects and thus receive feedback about possible weaknesses. Ideally, this feedback can be used to countervail specifically the weaknesses and successfully complete the course of study. If this is not possible, then the student will be screened out early enough to be able to switch to another course of study, or vocational training.

According to an example embodiment of the present invention, in one particularly advantageous configuration, several candidate specimens are provided for at least one component. Using prior data, which characterize each of these candidate specimens, the machine learning model in each case ascertains a prediction for the optical performance of a camera, which contains this candidate specimen. A combination of specimens of components for which this prediction satisfies a specified criterion is selected for the further production of the camera. If the properties of component specimens due to their prefabrication have a comparatively great spread, then a greater total of functioning cameras can be obtained in this manner.

Thus, for example, in a beam path of sequentially connected optical components, deviations of these components from the standard may mutually reinforce or mutually attenuate one another in their effect on the ultimate optical performance of the camera, depending on the direction in which each component deviates from the standard. If there is now in each case a pool of specimens for each component, it is possible, with the aid of the prediction from the machine learning model, specifically to combine with one another specimens of components from the respective pools whose deviations from the standard mutually attenuate one another. In this way, an operable camera can still be produced from components that are qualitatively poor taken by themselves. It is then no longer necessary to establish fixed limits for the deviations of the individual components from the standard, and discard components that exceed these limits as rejects.

In a further advantageous configuration of the present invention, measured data are collected multiple times during the adjustment process with respect to the optical performance of the combination of components in the current spatial arrangement relative to one another. Based on these measured data, the machine learning model ascertains in each case a prediction for the optical performance of the camera that results if the components are adhesively bonded to one another in their current arrangement. In response to this prediction satisfying a specified criterion, the components are adhesively bonded to one another. In this way, for example, deteriorations yet resulting from further production steps can be predicted and at least partially compensated for already before adhesive bonding. The final optical performance of the camera upon completion of production is improved thereby. This is somewhat similar to fruit being transported to the customer via a sea journey lasting several weeks by being shipped in an unripe condition so the customer does not receive it in a spoiled condition.

Thus, for example in particular during the adjustment, optimization with respect to the prediction provided by the machine learning model can be given priority over optimization with respect to the specified optimality criterion.

As explained above, the production process can be terminated in response to the optical performance prediction of the camera satisfying a specified criterion. In this way, further use of time and material for cameras that already can no longer be "rescued" can be avoided. Overall, a specified quantity of functioning cameras can thus be produced using less material.

The prior data can in particular characterize, e.g.,
a modulation transfer function (MTF) of an optical component, and/or
measurement results from a quality test of a component in the context of prefabrication, and/or
a supplier of a component, and/or at least one tool used for producing a component.

For example, the modulation transfer function can be ascertained in that the optical component images an object having at least one sharp edge. Ideally, this image should also be sharp. The MTF can then be quantified via ascertained characteristic values for the actual sharpness of the image.

Other measurement results from the quality test can include, e.g., an angle of undesirable image plane tilt caused by the optical component.

The supplier of a component may become relevant, for example, to the extent that the production processes, and therefore also their tolerances, differ from one supplier to the other. Also, for example, tools used in each case by one and the same supplier, such as molds for injection molded parts, can comprise small deviations from one another. For components respectively produced with these tools, these deviations can swing the deviations of the components from the standard into a specific direction.

In a further advantageous configuration of the present invention, the measured data characterize a modulation transfer function (MTF) of the combination of the components adjusted with respect to one another, and/or dimensions of a spatial arrangement of the components adjusted relative to one another. Especially when the optical performance of the completed camera is measured by its MTF, a preliminary measurement of the MTF during adjustment provides a good indication of the performance of the completed camera. The deviation of components from the standard can be approximately quantified via the spatial arrangement of the components during the adjustment. For example, if a specific component has to be moved particularly far out of a nominal position in order to adjust it relative to another component, this is an indication that one of the components deviates from the standard.

According to an example embodiment of the present invention, the method can in particular be computer-implemented. The method can in particular thus be embodied in a computer program with machine-readable instructions. When these machine-readable instructions are executed by one or more computers that themselves control a production facility for cameras, then the production facility is caused to perform the method described above.

The present invention also relates to a machine-readable data medium and/or a download product comprising the computer program. A download product is a digital product that can be transmitted via a data network, i.e., downloaded by a user of the data network, that can, for example, be offered for sale in an online shop for immediate download.

Furthermore, a computer can be equipped with the computer program, with the machine-readable data medium, or with the download product.

Furthermore, the present invention also relates to a camera production facility which is equipped with the computer program, with the machine-readable data medium, with the download product, and/or with the one or more computers.

Further measures improving the present invention, together with the description of the preferred embodiment examples of the present invention, are described in greater detail hereinafter with reference to figures.

DETAILED DESCRIPTION OF EXAMPLE EMBODIMENTS

Figure 1:
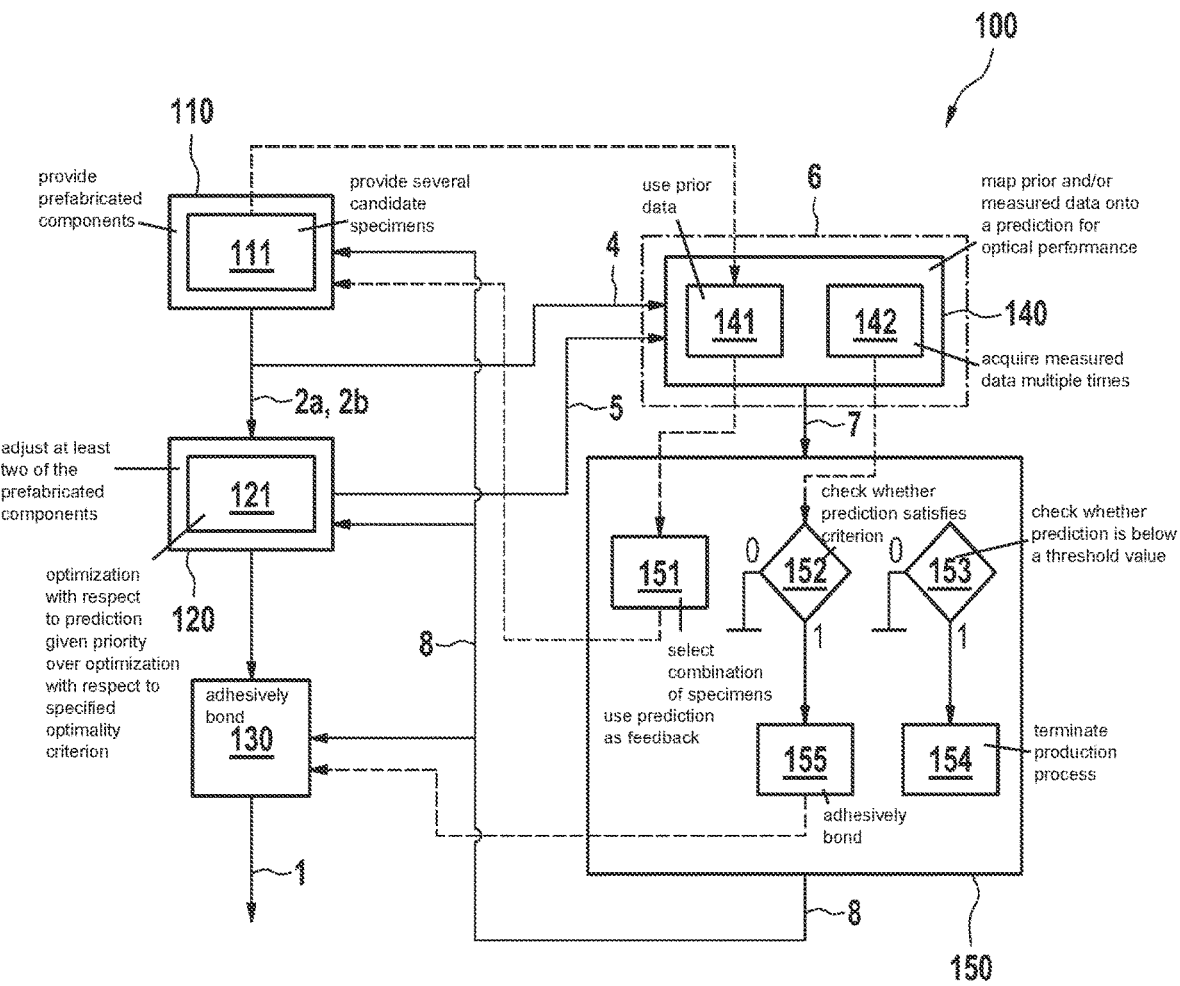
FIG. 1 shows an embodiment example of the method 100 for producing a camera 1, according to the present invention.

FIG. 1 is a schematic flow chart of an embodiment example of the method 100 for producing at least one camera 1.

In step 110, prefabricated components 2a, 2b are provided. In this case, in particular for example according to block 111, in each case several candidate specimens 2a1-2a5 or 2b1-2b5 can be provided for each component 2a, 2b.

In step 120, at least two of the prefabricated components 2a, 2b are adjusted with respect to one another in accordance with at least one specified optimality criterion. In step 130, these components 2a, 2b are adhesively bonded to one another in the adjusted state.

In step 140,
prior data 4a, 4b, which characterize a specific specimen 2a1-2a5, 2b1-2b5 of at least one of the prefabricated components 2a, 2b, and/or measured data 5 with respect to the optical performance of the combination of the components 2a, 2b adjusted with respect to one another are mapped by a trained machine learning model 6 onto a prediction 7 for the optical performance that the camera 1 will deliver after it has run through at least one additional production step after the adhesive bonding. In step 150, this prediction 7 is used as feedback in order to ascertain and apply an influencing action 8 on the production process. This influencing action 8 can be applied to the provision 110 of the components 2a, 2b, to the adjustment 120 of the components 2a, 2b with respect to one other, and/or to the adhesive bonding 130 of the components.

In particular, according to block 141, e.g., using prior data 4a, 4b, which characterize each one of several candidate specimens 2a1-2a5, 2b1-2b5, the machine learning model 6 is able in each case to ascertain a prediction 7 for the optical performance of a camera 1, which contains the respective candidate specimen 2a1-2a5, 2b1-2b5. According to block 151, a combination of specimens 2a1-2a5, 2b1-2b5 of components 2a, 2b, for which this prediction 7 satisfies a specified criterion, can then be selected for the further production of the camera 1. For example, the criterion can include that the prediction 7 is maximal, or at least above a specified threshold value. Selecting the combination of specimens 2a1-2a5, 2b1-2b5 is an influencing action 8 on the provision 110 of the components 2a, 2b.

According to block 142, it is possible, for example, during the adjustment, to acquire multiple times measured data 5 relating to the optical performance of the combination of components 2a, 2b in the current spatial arrangement with respect to one another, i.e., in the current state of the adjustment. Based on these measured data 5, the machine learning model 6 then ascertains a prediction 7 for the optical performance of the camera 1 that results if the components 2a, 2b are adhesively bonded to one another in this arrangement, i.e., if the current state of the adjustment is fixed. It can then be checked in block 152 whether this prediction satisfies a specified criterion, that is, whether it is maximal, for example, or at least exceeds a specified threshold value. If this is the case (truth value 1), then the components 2a, 2b can be adhesively bonded to one another according to block 155. Initiating the adhesive bonding 130 according to the prediction 7 is an influencing action 8 on the adhesive bonding 130.

According to block 121, during adjustment 120, optimization with respect to the prediction 7 provided by the machine learning model 6 can also be given priority over optimization with respect to the specified optimality criterion. The prediction 7 in this case thus also results in an influencing action 8 on the adjustment 120.

According to block 153, it can further be checked whether the prediction 7 for the optical performance of the camera satisfies a specified criterion, that is, whether it is below a specified threshold value, for example. If this is the case (truth value 1), then the production process can be terminated according to block 154.

Figure 2:
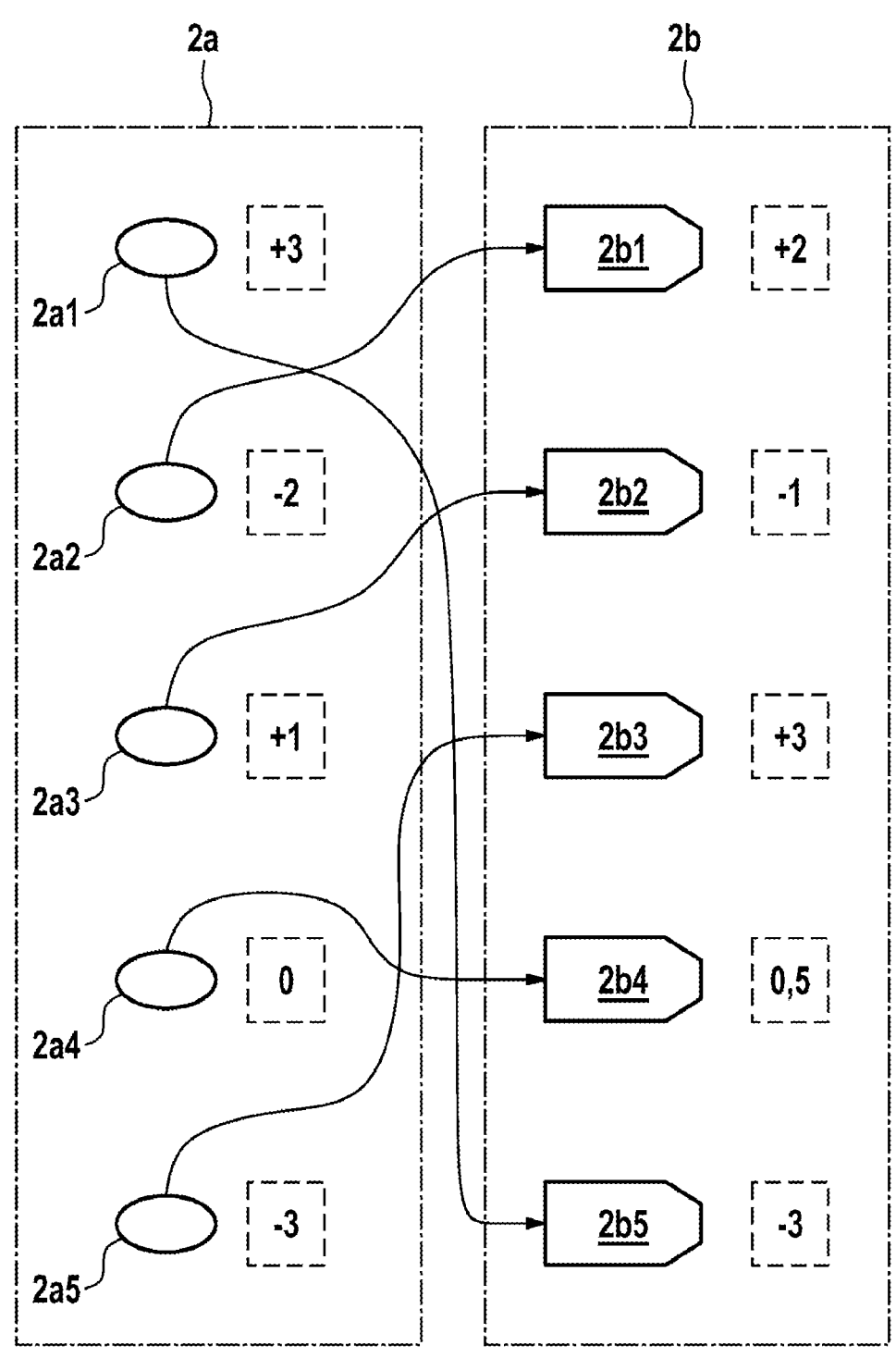
FIG. 2 shows exemplary advantageous pairings of specimens 2a1-2a5, 2b1-2b5 of components 2a, 2b, which in each case are produced with tolerances.

FIG. 2 shows by way of example how, with the aid of the prediction 7 ascertained by the machine learning model 6 during the production of cameras 1 from components 2a, 2b, whose properties are subject to a certain tolerance (spread) due to their prefabrication process, the yield of functioning cameras 1 can be increased and the rejects reduced.

In the example shown in FIG. 2, the component 2a is a lens, of which five different specimens 2a1-2a5 are available for selection. The component 2b is an objective, of which five different specimens 2b1-2b5 are available for selection.

The specimens 2*a*1-2*a*5, 2*b*1-2*b*5 are each marked with a number which indicates an exemplary deviation of an optical parameter of the respective specimen 2*a*1-2*a*5, 2*b*1-2*b*5 from the standard for the respective component 2*a*, 2*b*. For illustrative purposes, it is assumed by way of example that the respective deviations from the standard will add up in a serial connection of the lens 2*a* and the objective 2*b*.

In the example shown in FIG. 2, it can be ascertained based on the predictions 7 that, in the combinations of the lens 2*a*1 with the objective 2*b*5, of the lens 2*a*2 with the objective 2*b*1, of the lens 2*a*3 with the objective 2*b*2, and of the lens 2*a*5 with the objective 2*b*3 the respective deviations are precisely neutralized. The combination of the lens 2*a*4 and the objective 2*b*4 results in only a small deviation, which will not be further corrected.

The invention claimed is:

1. A method for producing a camera, comprising the following steps:

providing prefabricated components;

adjusting at least two of the prefabricated components relative to one another in accordance with at least one specified optimality criterion; and adhesively bonding the at least two of the prefabricated components to one another in the adjusted state;

wherein:

prior data characterizing a specific specimen of at least one of the prefabricated components, and/or measured data in respect of an optical performance of the combination of the at least two of the prefabricated components adjusted relative to one another, are mapped by a trained machine learning model onto a prediction for an optical performance that the camera will deliver once the camera has run through at least one additional production step after the adhesive bonding; and the prediction is used as feedback for an influencing action on the production process, wherein the prediction takes into account changes in the optical performance of the camera between the adhesive bonding and final completion.

2. The method according to claim 1, wherein:

several candidate specimens are provided for at least one of the at least two of the prefabricated components;

using prior data characterizing each candidate specimen of the candidate specimens, the machine learning model ascertains a respective prediction for an optical performance of a camera which contains the candidate specimen; and a combination of the candidate specimens for which the prediction satisfies a specified criterion, is selected for further production of the camera.

3. The method according to claim 1, wherein:

during the adjustment, the machine learning model ascertains multiple times, based on measured data relating to optical performance of a combination of the at least two of the prefabricated components in a current spatial arrangement relative to each other, a prediction for the optical performance of the camera which results when the at least two of the prefabricated components are adhesively bonded to one another in this arrangement; and in response to the prediction satisfying a specified criterion the at least two of the prefabricated components are adhesively bonded to one another.

4. The method according to claim 3, wherein, during the adjustment, optimization with respect to the prediction provided by the machine learning model is given priority over optimization with respect to the specified optimality criterion.

5. The method according to claim 1, wherein, in response to the prediction for the optical performance of the camera satisfying a specified criterion, the production process is terminated.

6. The method according to claim 1, wherein the prior data characterize:

a modulation transfer function (MTF) of an optical component, and/or measurement results from a quality test of a component in the context of prefabrication, and/or a supplier of a component, and/or at least one tool used for the production of a component.

7. The method according to claim 1, wherein the measured data characterize:

a modulation transfer function of a combination of the at least two of the prefabricated components adjusted relative to one another, and/or dimensions of a spatial arrangement of the at least two of the prefabricated components adjusted to one another.

8. The method according to claim 1, wherein the prediction for the optical performance characterizes a modulation transfer function of the camera as completed.

9. A non-transitory machine-readable data medium on which is stored a computer program including machine-readable instructions for producing a camera, the instructions, when executed by one or more computers, cause the one or more computers in combination of a production facility for cameras controller by the one or more computers, to perform the following steps:

providing prefabricated components;

adjusting at least two of the prefabricated components relative to one another in accordance with at least one specified optimality criterion; and adhesively bonding the at least two of the prefabricated components to one another in the adjusted state;

wherein:

prior data characterizing a specific specimen of at least one of the prefabricated components, and/or measured data in respect of an optical performance of the combination of the at least two of the prefabricated components adjusted relative to one another, are mapped by a trained machine learning model onto a prediction for an optical performance that the camera will deliver once the camera has run through at least one additional production step after the adhesive bonding; and the prediction is used as feedback for an influencing action on the production process, wherein the prediction takes into account changes in the optical performance of the camera between the adhesive bonding and final completion.

10. One or more computers comprising:

a non-transitory machine-readable data medium on which is stored a computer program including machine-readable instructions for producing a camera, the instructions, when executed by the one or more computers, cause the one or more computers in combination of a production facility for cameras controller by the one or more computers, to perform the following steps:

providing prefabricated components;

adjusting at least two of the prefabricated components relative to one another in accordance with at least one specified optimality criterion; and adhesively bonding the at least two of the prefabricated components to one another in the adjusted state;

wherein:

prior data characterizing a specific specimen of at least one of the prefabricated components, and/or measured data in respect of an optical performance of the combination of the at least two of the prefabricated components adjusted relative to one another, are mapped by a trained machine learning model onto a prediction for an optical performance that the camera will deliver once the camera has run through at least one additional production step after the adhesive bonding; and the prediction is used as feedback for an influencing action on the production process, wherein the prediction takes into account changes in the optical performance of the camera between the adhesive bonding and final completion.

11. A production facility for cameras, the production facility configured to:

provide prefabricated components;

adjust at least two of the prefabricated components relative to one another in accordance with at least one specified optimality criterion; and adhesively bond the at least two of the prefabricated components to one another in the adjusted state;

wherein:

prior data characterizing a specific specimen of at least one of the prefabricated components, and/or measured data in respect of an optical performance of the combination of the at least two of the prefabricated components adjusted relative to one another, are mapped by a trained machine learning model onto a prediction for an optical performance that the camera will deliver once the camera has run through at least one additional production step after the adhesive bonding; and the prediction is used as feedback for an influencing action on the production process, wherein the prediction takes into account changes in the optical performance of the camera between the adhesive bonding and final completion.

* * * * *